(12) United States Patent
Ueno

(10) Patent No.: US 8,090,498 B2
(45) Date of Patent: Jan. 3, 2012

(54) TURNING DIRECTION INDICATOR

(75) Inventor: Wataru Ueno, Fukui (JP)

(73) Assignee: Panasonic Corporation, Osaka (JP)

( * ) Notice: Subject to any disclaimer, the term of this patent is extended or adjusted under 35 U.S.C. 154(b) by 396 days.

(21) Appl. No.: 12/370,140

(22) Filed: Feb. 12, 2009

(65) Prior Publication Data

US 2009/0205936 A1   Aug. 20, 2009

(30) Foreign Application Priority Data

Feb. 18, 2008 (JP) ................. 2008-035591

(51) Int. Cl.
*H01H 7/08* (2006.01)
(52) U.S. Cl. .................. 701/36; 200/61.32; 701/1
(58) Field of Classification Search .......... 200/61.28
See application file for complete search history.

(56) References Cited

U.S. PATENT DOCUMENTS 6,889,161 B2 *   5/2005   Winner et al. ............... 702/147
7,386,385 B2 *   6/2008   Heinrichs-Bartscher ....... 701/96

FOREIGN PATENT DOCUMENTS

JP   2006-256356   9/2006
* cited by examiner

*Primary Examiner* — Elvin G Enad
*Assistant Examiner* — Lisa Klaus
(74) *Attorney, Agent, or Firm* — Wenderoth, Lind & Ponack, L.L.P.

(57) ABSTRACT

A turning direction indicator controls the operation of a light source for turn signals and indicates a turning direction of the vehicle. Switch contacts are brought into electrical contact with each other, responsive to operation of an operating part. An angular velocity sensor detects an angular velocity of a vehicle turning, and outputs an angular velocity signal. A controller controls the output of a drive signal for causing operation of the light source, according to the electrical contact between the switch contacts and the angular velocity signal. The controller controls the output of the drive signal, according to the angular velocity signal, and a speed signal indicating a speed of the vehicle. The controller controls the output of the drive signal, according to the relation between the set threshold value and the angular velocity signal, and the relation between the angular velocity signal and the speed signal.

11 Claims, 15 Drawing Sheets

TURNING DIRECTION INDICATOR

BACKGROUND OF THE INVENTION

1. Field of the Invention

The present invention relates to a turning direction indicator in which operation of a lever thereof causes a turn signal lamp or the like to flash mainly when the vehicle makes a turn, such as a right or left turn or a lane change.

2. Background Art

There is a wide range of uses of a turning direction indicator in which operation of a lever thereof disposed under the steering wheel of the vehicle causes the turn signal lamp in the turning direction of the vehicle to flash and indicate the turning direction, during a right or left turn or a lane change. A description is provided of such a conventional turning direction indicator, with reference to FIGS. 15 and 16.

FIG. 16 is a structural diagram of a conventional turning direction indicator. Case 101 has substantially a box shape, and is composed of an insulating resin. Lever 102 has substantially a cylindrical shape, and is composed of an insulating resin. Lever 102 projects outwardly from the right side of case 101 and is attached to case 101 so that the position thereof is vertically changeable.

When a driver changes a position of lever 102 from a neutral position thereof in the upward or downward direction, and releases the hand therefrom, lever 102 is automatically returned to the neutral position by a spring (not shown) or the like provided between the lever and case 101. In other words, lever 102 is formed into a so-called automatically returning type.

Housed in case 101 is a wiring board (not shown) having a plurality of wiring patterns on both sides thereof. On this wiring board, a plurality of switch contacts 103 to be brought into or out of electrical contact with each other in response to the operation of lever 102 are formed of copper alloy or the like.

Further, controller 104 including electronic components, such as a microprocessor, is disposed on the wiring board. The plurality of switch contacts 103 are electrically connected to controller 104. Thus turning direction indicator 105 is formed.

As shown in the perspective view of FIG. 15, such turning direction indicator 105 is installed in front of the driver's seat in a vehicle so that lever 102 projects outwardly under steering wheel 106. Lever 112 is prepared to operate another function.

Further, rotating angle detector 107 is similarly disposed under steering wheel 106. Rotating angle detector 107 is formed to detect a rotating direction and a rotating angle of steering wheel 106, using a photo element, magnetic element, or the like incorporated therein. Rotating angle detector 107 is electrically connected to controller 104 of turning direction indicator 105 by a connector or lead (not shown).

Further, drive part 108 is connected to controller 104 of turning direction indicator 105. Drive part 108 includes a flasher relay. Turn signal lamp 109L disposed on the left side of the vehicle and turn signal lamp 109R disposed on the right side of the vehicle are connected to drive part 108. Drive part 108 and turn signal lamps 109R and 109L form lighting device 110.

In the above structure, when the driver changes the position of lever 102 from a neutral position N114 to a left turn position L116 in the upward direction during a left turn of the vehicle at an intersection or the like, for example, this operation brings predetermined switch contacts 103 into electrical contact with each other. When the driver releases the hand from lever 102, lever 102 automatically returns to the neutral position. At this time, controller 104 detects the electrical contact between switch contacts 103 and outputs a predetermined drive signal to drive part 108. Thus turn signal lamp 109L on the left side of the vehicle body flashes.

Next, suppose the driver rotates steering wheel 106 in the left direction to turn the vehicle left, and thereafter rotates steering wheel 106 in the right direction to return the vehicle to a straight-ahead state. During this operation, rotating angle detector 107 detects the rotating direction and rotating angle of steering wheel 106, and these rotation signals are supplied from rotating angle detector 107 to controller 104.

When controller 104 detects that the vehicle has returned to the straight-ahead state after the left turn according to these rotation signals, controller 104 stops output of the drive signal to drive part 108. At this time, left turn signal lamp 109L is turned off, and the flashing operation of lighting device 110 is stopped.

When the vehicle changes from the center lane to the left side or right side lane, for example, the position of lever 102 is changed to the intermediate position between the neutral position N114 and the left turn position L116 in the upward direction or the intermediate position between the neutral position and a right turn position R118 in the downward direction, respectively. At this time, while the driver is holding lever 102 with the hand, predetermined switch contacts 103 are brought into electrical contact with each other. Controller 104 detects this electrical contact and outputs the drive signal to drive part 108. Thus turn signal lamp 109L on the left side or the turn signal lamp 109R on the right side flashes only while the driver is holding the lever.

In short, controller 104 detects an operating position of lever 102 according to the electrical contact between the plurality of switch contacts 103, and accordingly outputs the drive signal for causing operation of lighting device 110. Controller 104 also detects the rotating direction and the rotating angle of steering wheel 106 according to the rotation signal from rotating angle detector 107. According to this detection, the output of the drive signal is stopped. Thus turn signal lamp 109L or 109R is flashed and turned off when the vehicle makes a turn, such as a right or left turn or a lane change.

A technique related to the above conventional turning direction indicator is disclosed in Japanese Patent Unexamined Publication No. 2006-256356.

For the above conventional turning direction indicator, rotating angle detector 107 is used to detect the rotating direction and the rotating angle of steering wheel 106. Thus, in addition to lighting device 110, turning direction indicator 105 is electrically connected to rotating angle detector 107, a device separate from turning direction indicator 105, by a connector, lead, or the like. Thus the structure is complicated and vehicle assembly takes more time and labor.

SUMMARY OF THE INVENTION

In order to control the operation of a light source for turn signals and to indicate a turning direction, a turning direction indicator includes the following elements.

Switch contacts are brought into or out of electrical contact with each other, in response to operation of an operating part. An angular velocity sensor detects an angular velocity of a turn of the vehicle, and outputs an angular velocity signal. A controller controls output of a drive signal for causing operation of a light source like flashers, according to the electrical contact between the switch contacts and the angular velocity signal.

Further, the controller controls the output of the drive signal, according to the angular velocity signal, and a speed signal indicative of a speed of the vehicle.

Further, the controller sets or calculates a predetermined threshold value for the angular velocity signal.

Further, the controller controls the output of the drive signal, according to the relation between the set threshold value and the angular velocity signal, and the relation between the angular velocity signal and the speed signal.

In the turning direction indicator as structured as above, the controller outputs or stops the drive signal, according to the angular velocity signal from the angular velocity sensor integratable with the turning direction indicator, without the use of a steering wheel angle sensor. This can eliminate the need for complicated connection, simplify the structure of the indicator, and ensure indication of a direction.

This turning direction indicator ensures indication of a turning direction without any false detection even when the vehicle once stops in the middle of a left or right turn, for example.

Further, this turning direction indicator ensures indication of a turning direction without any false detection even when the vehicle makes a gentle left or right turn with a low angular velocity, or a lane change in a curved path.

DETAILED DESCRIPTION OF THE INVENTION

Figure 1:
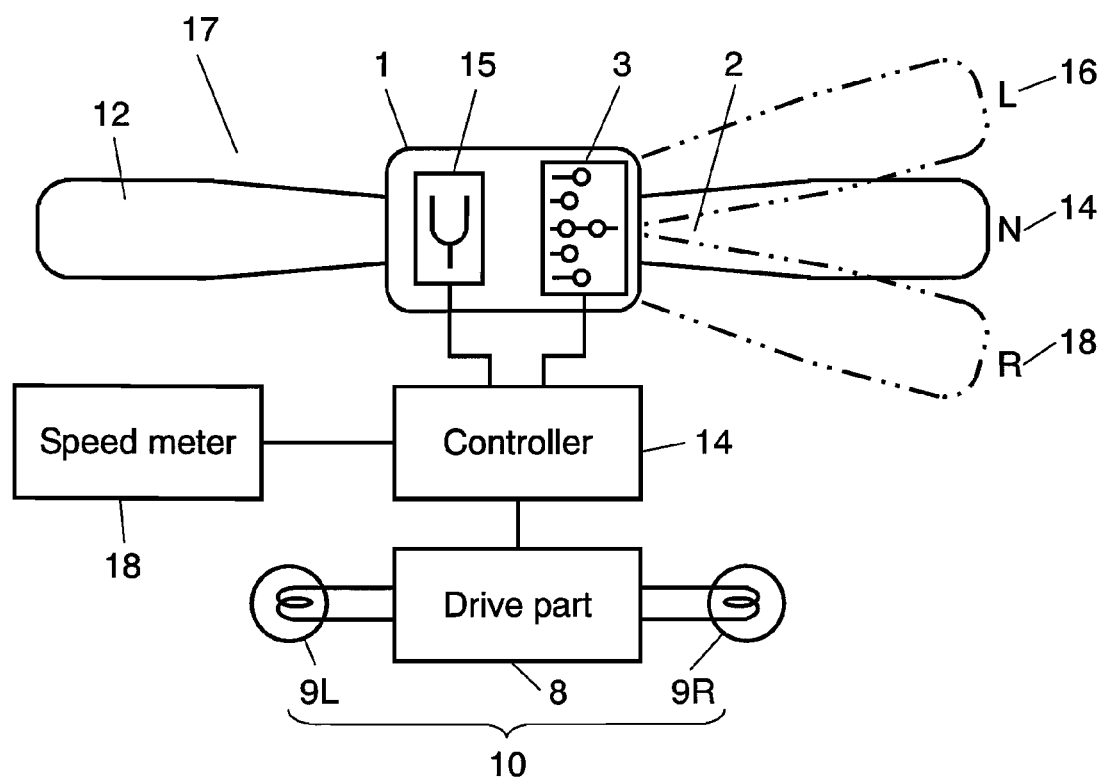
FIG. 1 shows a structure of a turning direction indicator in accordance with an exemplary embodiment of the present invention.
Figure 2:
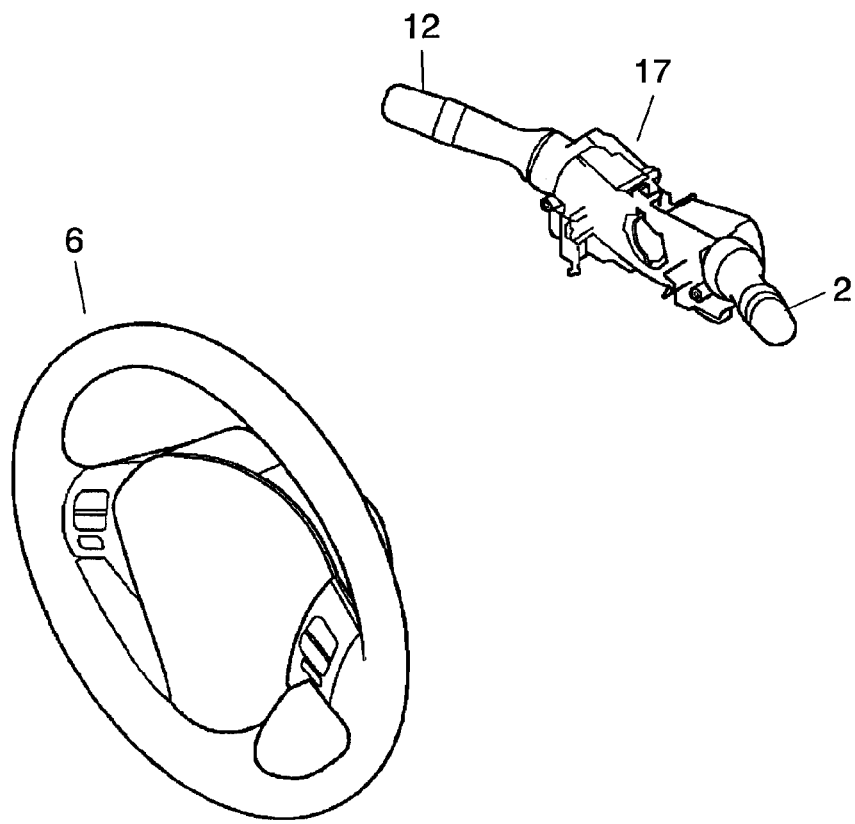
FIG. 2 shows a perspective view of a steering wheel in accordance with the exemplary embodiment of the present invention.

Hereinafter, a description is provided of an exemplary embodiment of the present invention with reference to FIGS. 1 through 14C. FIG. 1 shows a structure of a turning direction indicator in accordance with the exemplary embodiment of the present invention. FIG. 2 shows a perspective view of a steering wheel for use in combination with the turning direction indicator of FIG. 1. Turning direction indicator 17 is used in a vehicle that includes steering wheel 6, speed meter 18, and turn signal lamps 9R and 9L, i.e. a light source for turn signals, and indicates a turning direction of the vehicle. Instead of turn signal lamps 9R and 9L, it is possible to use a lamp and a mirror which switches the lighting direction. Turning direction indicator 17 includes lever 2, i.e. an operating part, a plurality of switch contacts 3, angular velocity sensor 15, and controller 14. Switch contacts 3 are brought into or out of electrical contact with each other, in response to operation of lever 2. Angular velocity sensor 15 detects an angular velocity of a turn of the vehicle and outputs an angular velocity signal. Controller 14 controls the output of a drive signal for causing operation of turn signal lamp 9R or 9L, according to the electrical contact between switch contacts 3 and the angular velocity signal from angular velocity sensor 15.

Case 1 has substantially a box shape, and is composed of an insulating resin. Lever 2 has substantially a cylindrical shape, and is composed of an insulating resin. With reference to FIG. 1 and FIG. 2, lever 2 projects outwardly from the right side of case 1, and is attached to case 1 so that the position thereof is vertically changeable.

When a driver changes a position of lever 2, i.e. the operating part, from a neutral position thereof in the upward or downward direction and releases the hand therefrom, lever 2 is automatically returned to the neutral position by a spring (not shown) or the like provided between the lever 2 and case 1. In other words, lever 2 is formed into a so-called automatically returning type.

Housed in case 1 is a wiring board (not shown) having a plurality of wiring patterns on both sides thereof. Formed on this wiring board are a plurality of switch contacts 3 to be brought into or out of electrical contact with each other in response to the operation of lever 2, and controller 14 including electronic components, such as a microprocessor.

Further, angular velocity sensor 15 includes a silicon tuning fork and a piezoelectric body. When an angular velocity is applied to angular velocity sensor 15 with the angular velocity sensor excited by application of a voltage, angular velocity sensor 15 generates a voltage in proportion to the magnitude of this angular velocity. Angular velocity sensor 15 and the plurality of switch contacts 3 are electrically connected to controller 14. Thus turning direction indicator 17 is formed.

As shown in FIG. 2, such turning direction indicator 17 is installed in front of the driver's seat in a vehicle so that lever 2 projects outwardly under steering wheel 6. Controller 14 is electrically connected to speed meter 18 by a connector, lead (not shown) or the like. Lever 12 is prepared to operate another function.

Further, drive part 8 includes a flasher relay. Turn signal lamp 9L disposed on the left side of the vehicle and turn signal lamp 9R disposed on the right side of the vehicle are connected to drive part 8. Drive part 8, and turn signal lamps 9R and 9L form lighting device 10.

Instead of lever 2, keys (not shown) or switch knobs may be used as the operating part to bring the plurality of switching contacts 3 into or out of electrical contact with each other.

First Operation Example

Figure 3:
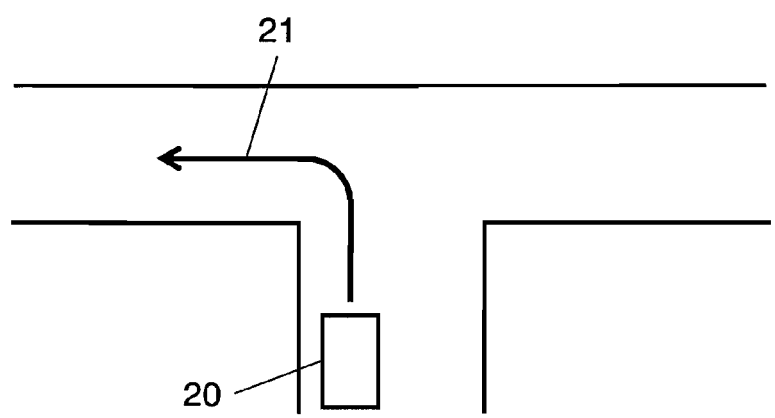
FIG. 3 is a plan view showing an operation of a vehicle in accordance with a first operation example of the exemplary embodiment of the present invention.
Figure 4A:
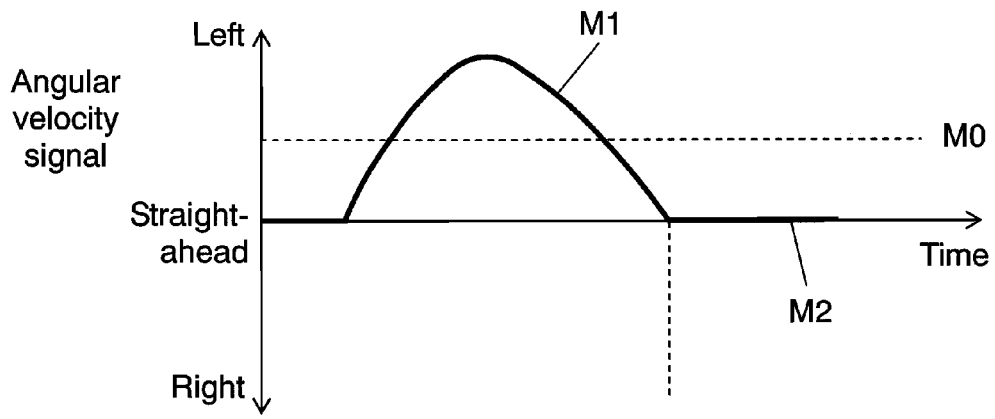
FIG. 4A, FIG. 4B, and FIG. 4C are waveform charts showing signals in the turning direction indicator of FIG. 1 in accordance with the first operation example of the exemplary embodiment of the present invention.
Figure 4B:
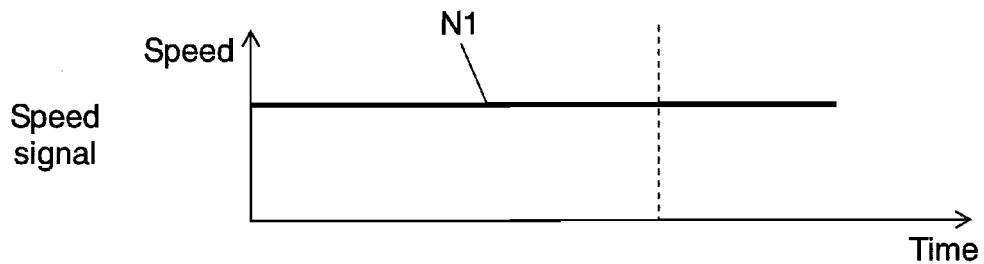
Figure 4C:
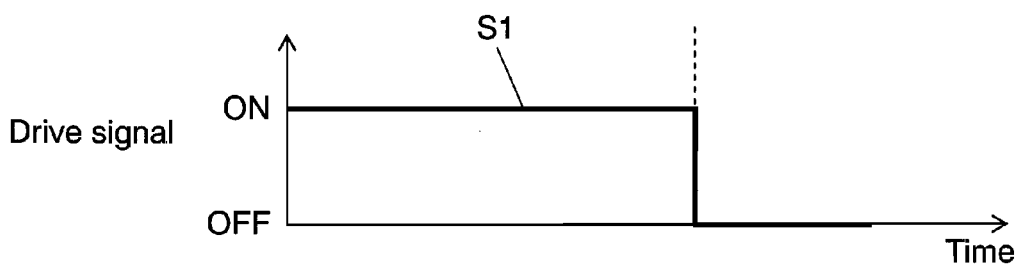

Next, a description is provided of the first operation example, with reference to FIGS. 3 through 4C. FIG. 3 is a plan view showing an operation of a vehicle in accordance with the first operation example of the exemplary embodiment. FIG. 4A, FIG. 4B, and FIG. 4C are waveform charts showing signals in accordance with the first operation example of the exemplary embodiment.

For example, assume that vehicle 20 in a straight-ahead state is turned left at an intersection or the like as shown by line with arrow 21 indicative of the traveling direction of the vehicle in FIG. 3. Before vehicle 20 is turned left, the driver changes the position of lever 2 from a neutral position N14 to a left turn position L16 in the upward direction. At this time, this operation brings predetermined switch contacts 3 into electrical contact with each other. When the driver releases the hand from lever 2 thereafter, lever 2 automatically returns to the neutral position. At this time, controller 14 detects the electrical contact between switch contacts 3 and outputs a predetermined drive signal to drive part 8. Thus turn signal lamp 9L on the left side of the vehicle body flashes.

Next, when the driver turns steering wheel 6 in the left direction and turns the vehicle left, the angular velocity in the left direction generated by this left turn is applied to angular velocity sensor 15. Thus, as shown in the waveform chart of FIG. 4A, an angular velocity signal M1 having a voltage waveform in proportion to the magnitude of the angular velocity is supplied from angular velocity sensor 15 to controller 14.

At this time, to controller 14, a speed signal N1 as shown in FIG. 4B is supplied from speed meter 18. In order to prevent false detection caused by vibrations of the vehicle in running, a threshold value M0 of the angular velocity is set at a predetermined magnitude and stored in controller 14.

This threshold value M0 is changed depending on the speed of the vehicle. For example, at a low speed of approximately 30 to 40 km/h, the threshold value is set to a relatively large value of 20 to 50°. At a high speed of approximately 60 to 80 km/h, the threshold value is set to a relatively small value of 1 to 5°.

Further, when the driver rotates steering wheel 6 in the right direction and returns the vehicle body to the straight-ahead state after such a left turn, the angular velocity applied to angular velocity sensor 15 becomes zero. Thus, from angular velocity sensor 15 to controller 14, an angular velocity signal M2 at a constant value is supplied.

According to this angular velocity signal M2, controller 14 stops the output of the drive signal S1 to drive part 8, as shown in FIG. 4C. Thus left turn signal lamp 9L is turned off and the flashing operation of lighting device 10 is stopped.

In short, controller 14 outputs the drive signal S1 for causing operation of lighting device 10, according to the electrical contact between switch contacts 3. Thereafter, with no substantial change in speed signal N1, the angular velocity signal M1 exceeding the threshold value M0 is supplied from angular velocity sensor 15. First, with this signal, controller 14 detects that the vehicle has made a left turn. Next, according to the subsequent output of the angular velocity signal M2, controller 14 detects that the vehicle has returned to the straight-ahead state, and stops the output of the drive signal S1.

Second Operation Example

Figure 5:
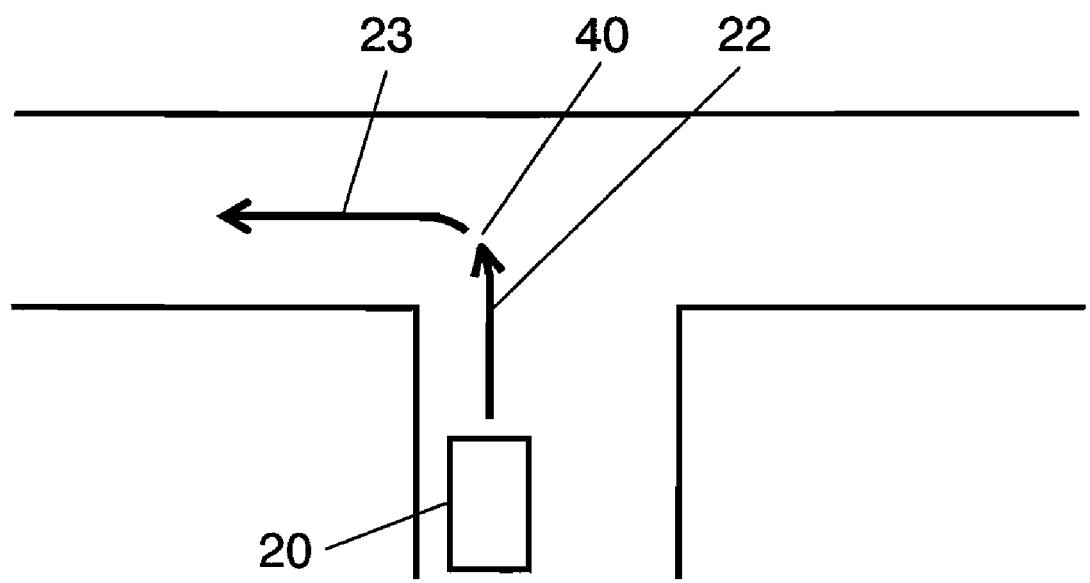
FIG. 5 is a plan view showing an operation of the vehicle in accordance with a second operation example of the exemplary embodiment of the present invention.
Figure 6A:
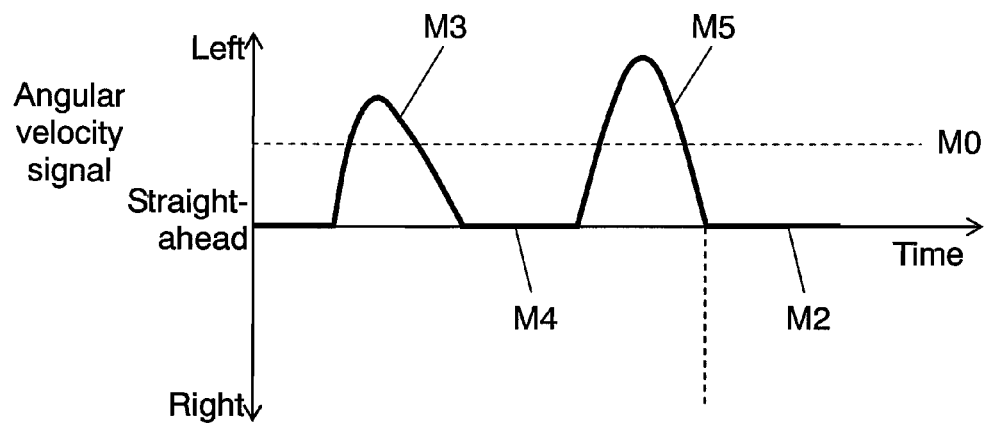
FIG. 6A, FIG. 6B, and FIG. 6C are waveform charts showing signals in the turning direction indicator of FIG. 1 in accordance with the second operation example of the exemplary embodiment of the present invention.
Figure 6B:
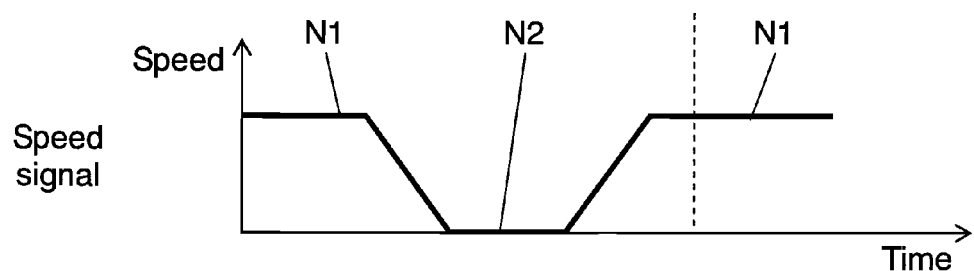
Figure 6C:
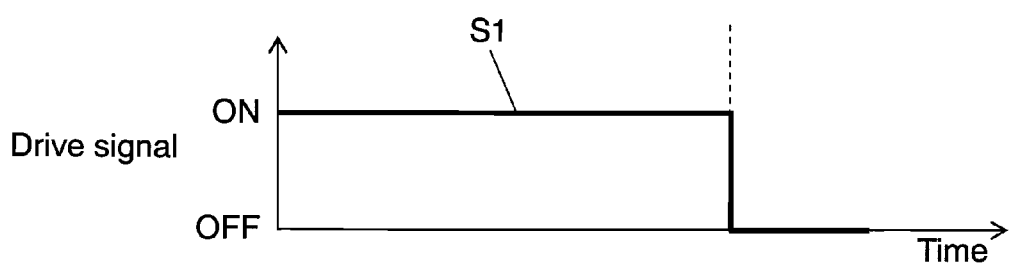

Next, a description is provided of the second operation example, with reference to FIGS. 5 through 6C. FIG. 5 is a plan view showing an operation of the vehicle in accordance with the second operation example of the exemplary embodiment. FIG. 6A, FIG. 6B, and FIG. 6C are waveform charts showing signals in accordance with the second operation example of the exemplary embodiment.

In the first operation example, a description is provided of a case where the vehicle makes a left turn at substantially a constant speed. On the other hand, in a case where vehicle 20 once stops at point 40 in the middle of a left turn and thereafter continues the left turn again as shown by lines with arrows 22 and 23 in FIG. 5, the signals shown in the waveform chart of FIG. 6A are supplied from angular velocity sensor 15 to controller 14 in the following sequence:

1. An angular velocity signal M3 indicative of the angular velocity of the left turn;
2. After the angular velocity signal M3, an angular velocity signal M4 indicative of no angular velocity because of the stoppage of the vehicle;
3. An angular velocity signal M5 indicating that the left turn is made again; and
4. The angular velocity signal M2 indicative of no angular velocity because of the straight-ahead running.

In other words, because no angular velocity is applied to angular velocity sensor 15 while the vehicle is stopped or in straight-ahead running, controller 14 cannot determine whether the vehicle is stopped or in straight-ahead running according to these angular velocity signals M4 and M2. In this case, controller 14 controls the flashing operation of lighting device 10, using a speed signal from speed meter 18 of the vehicle as shown in FIG. 6B.

First, when the angular velocity signal M4 during the stop is supplied, controller 14 detects that the vehicle is stopped, according to a speed signal N2 indicating that the speed is 0. Next, according to input of the angular velocity signal M5 and the speed signal N1, controller 14 detects that the left turn is continued again. Lastly, upon detecting that the angular velocity signal is changed to the angular velocity signal M2 indicative of no angular velocity and the speed signal N1 is kept, controller 14 detects that the vehicle has completed the left turn and is in the straight-ahead state.

As shown in FIG. 6C, while the angular velocity signal M4 or M5 is supplied, controller 14 continues to output the drive signal S1 to drive part 8, so that left turn signal lamp 9L flashes. At a point when the angular velocity signal M5 is changed to the angular velocity signal M2, controller 14 stops the output of the drive signal S1 to drive part 8, so that left turn signal lamp 9L is turned off.

In short, controller 14 controls the output of the drive signal S1, according to the vehicle speed signals N1 and N2, in addition to the angular velocity signals M3, M4, M5, and M2. Thus, as described above, even when the vehicle once stops in the middle of a left turn, the turning direction indicator ensures indication of a turning direction without any false detection.

Third Operation Example

Figure 7:
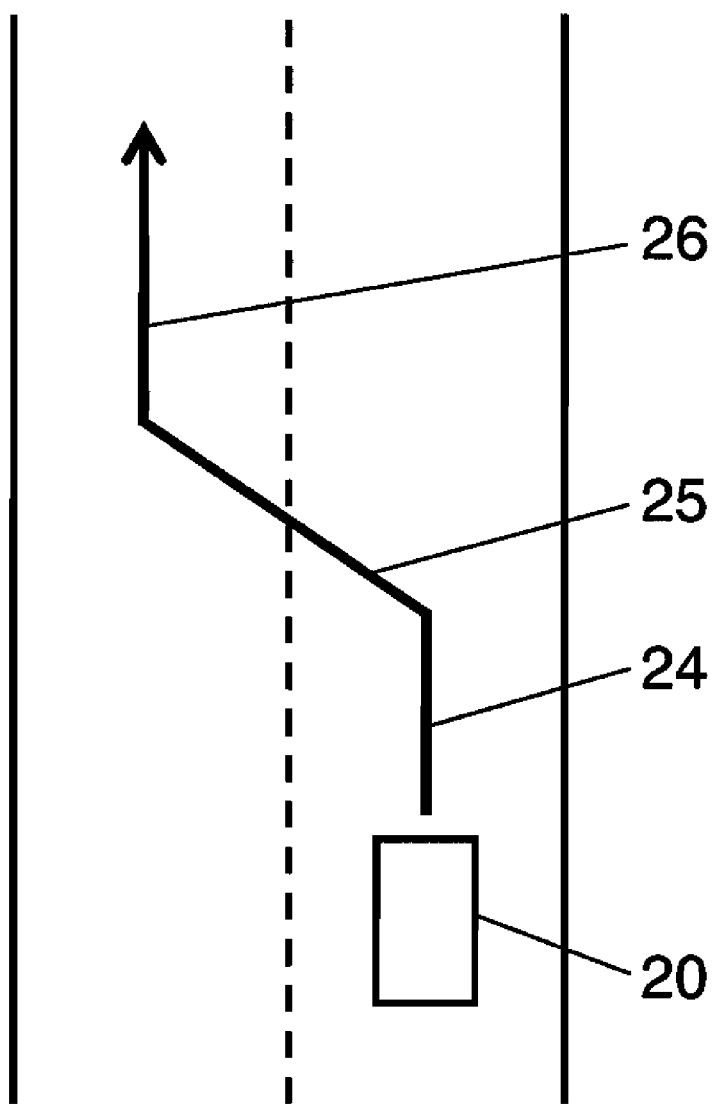
FIG. 7 is a plan view showing an operation of the vehicle in accordance with a third operation example of the exemplary embodiment of the present invention.
Figure 8A:
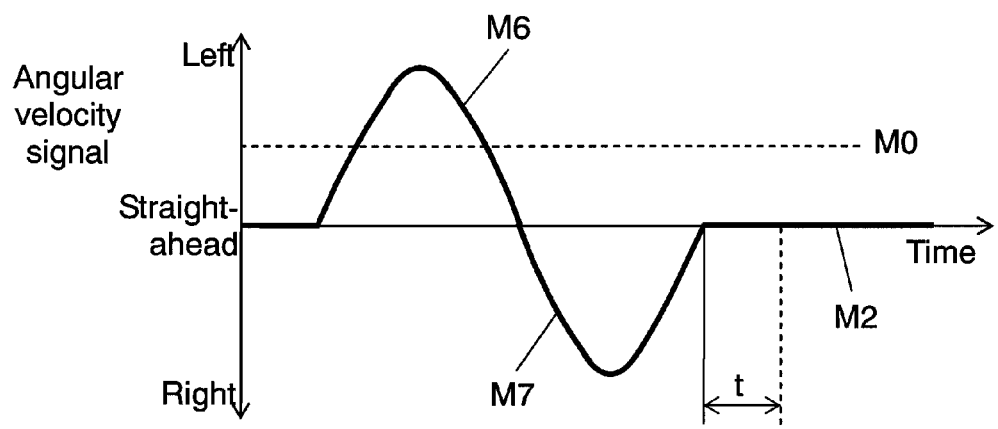
FIG. 8A, FIG. 8B, and FIG. 8C are waveform charts showing signals in the turning direction indicator of FIG. 1 in accordance with the third operation example of the exemplary embodiment of the present invention.
Figure 8B:
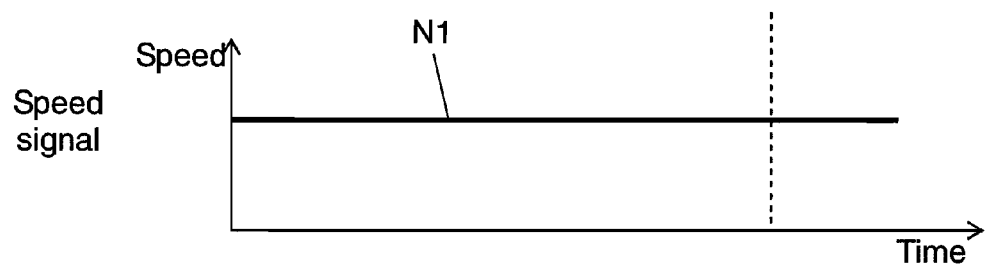
Figure 8C:
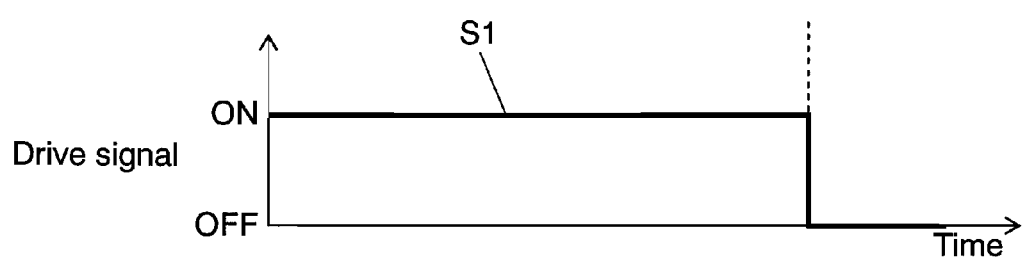

Next, a description is provided of the third operation example, with reference to FIGS. 7 through 8C. FIG. 7 is a plan view showing an operation of the vehicle in accordance with the third operation example of the exemplary embodiment. FIG. 8A, FIG. 8B, and FIG. 8C are waveform charts showing signals in accordance with the third operation example of the exemplary embodiment.

For example, before the vehicle is changed from the center lane to the left side or right side lane, the driver changes the position of lever 2 to the intermediate position between the neutral position N14 and the left turn position L16 in the upward direction or the intermediate position between the neutral position and a right turn position R18 in the downward direction, respectively. At this time, while the driver is holding lever 2 with the hand, predetermined switch contacts 3 are brought into electrical contact with each other. Controller 14 detects this electrical contact, and outputs the drive signal to drive part 8. As a result, only while the driver is holding the lever, left turn signal lamp 9L or a right turn signal lamp 9R flashes.

Alternatively, suppose that the driver does not move lever 2 to the above intermediate position, but changes the position of lever 2 from the neutral position N14 to the left turn position L16 in the upward direction, so that left turn signal lamp 9L flashes. Further, suppose that, as shown by lines 24 and 25, and line 26 having the arrow in FIG. 7, the driver relatively sharply turns steering wheel 6 in the left direction and moves vehicle 20 from the right side lane to the left side lane. In these cases, as shown in the waveform chart of FIG. 8A, an angular velocity signal M6 at a large voltage exceeding the threshold value M0 in the left direction is supplied from angular velocity sensor 15 to controller 14.

Suppose that immediately after such a lane change, the driver relatively sharply rotates steering wheel 6 in the right direction and returns the vehicle to the straight-ahead state in the left side lane. In this case, from angular velocity sensor 15 to controller 14, first, an angular velocity signal M7 in the right direction is supplied, and next the angular velocity signal M2 indicative of no angular velocity in straight-ahead running is supplied. In FIG. 8A or other charts showing changes in the angular velocity signal with time, both values indicative of the left direction and the right direction are shown in positive values.

At this time, from speed meter 18 to controller 14, the speed signal N1 as shown in FIG. 8B is supplied. Thus controller 14 detects that, while the vehicle is running at substantially a constant speed, the driver makes a left turn with an angular velocity exceeding the threshold value M0 and thereafter returns the vehicle to the straight-ahead state by a reverse right turn.

When controller 14 detects such angular velocity signals M6, M7, and M2 and the speed signal N1, as shown in FIG. 8C, controller 14 stops the output of the drive signal S1 to drive part 8, a predetermined time period t, e.g. 0.5 second later, after the angular velocity signal M2 indicative of straight-ahead running is supplied. Thus left turn signal lamp 9L is turned off.

In short, when the driver makes a large turn with an angular velocity exceeding the threshold value M0 and immediately thereafter returns the vehicle to the straight-ahead state by a reverse turn, controller 14 makes the control so that the flashing operation of lighting device 10 is stopped, the predetermined time period t later after the vehicle is returned to the straight-ahead state.

Fourth Operation Example

Figure 9:
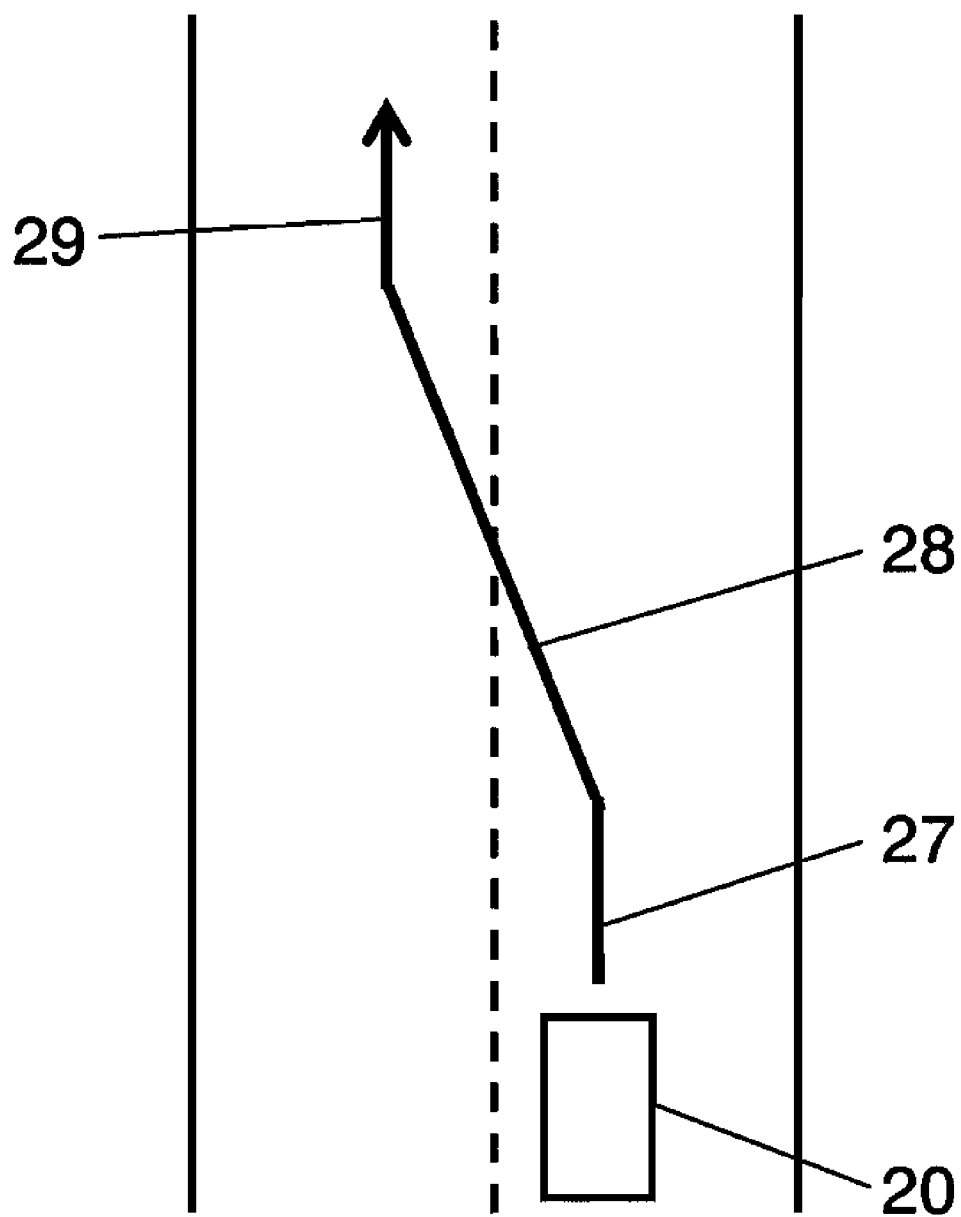
FIG. 9 is a plan view showing an operation of the vehicle in accordance with a fourth operation example of the exemplary embodiment of the present invention.
Figure 10A:
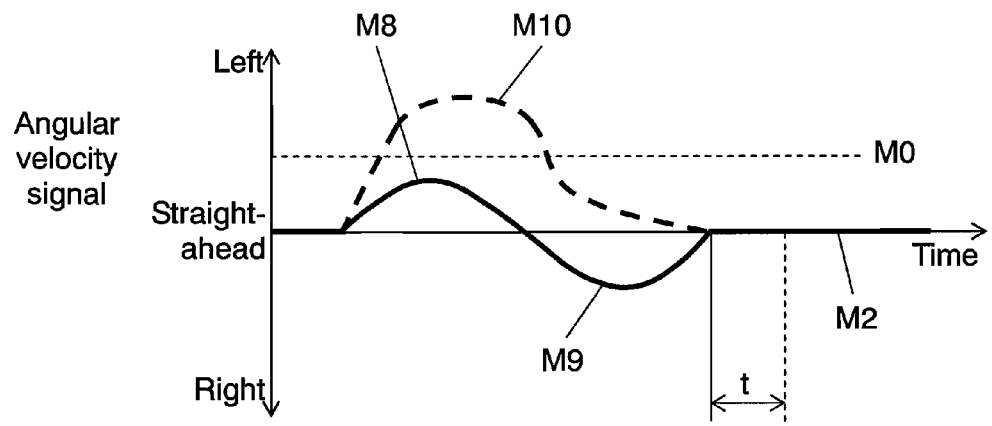
FIG. 10A, FIG. 10B, and FIG. 10C are waveform charts showing signals in the turning direction indicator of FIG. 1 in accordance with the fourth operation example of the exemplary embodiment of the present invention.
Figure 10B:
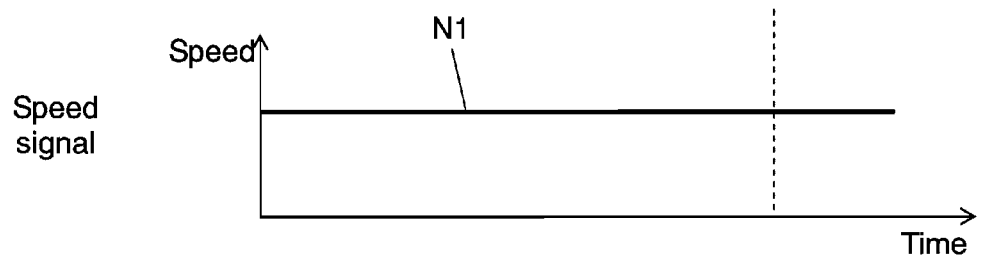
Figure 10C:
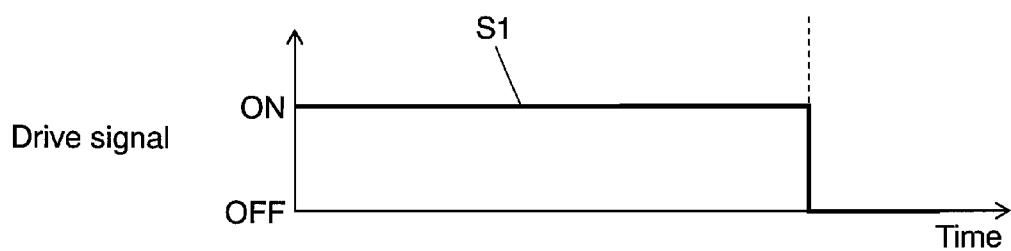

Next, a description is provided of the fourth operation example, with reference to FIGS. 9 through 10C. FIG. 9 is a plan view showing an operation of the vehicle in accordance with the fourth operation example of the exemplary embodiment. FIG. 10A, FIG. 10B, and FIG. 10C are waveform charts showing signals in accordance with the fourth operation example of the exemplary embodiment.

Instead of the relatively sharp lane change in the third operation example, suppose, while left turn signal lamp L9 is flashing, the driver gently turns steering wheel 6 in the left and right directions and changes vehicle 20 from the right side lane to the left side lane, as shown by lines 27 and 28 and line 29 with the arrow in FIG. 9. In this case, as shown in the waveform chart of FIG. 10A, angular velocity signals M8 and M9 in the left and right directions, respectively, each having a voltage smaller than that of the threshold value M0, are supplied from angular velocity sensor 15 to controller 14. At this time, from speed meter 18 to controller 14, the speed signal N1 as shown in FIG. 10B is supplied.

In this condition, the angular velocity signals M8 and M9 are smaller than the threshold value M0. Thus the drive signal S1 is continuously supplied from controller 14 to drive part 8. However, upon detection of such angular velocity signals M8 and M9, controller 14 calculates an accumulated value of the values of these angular velocity signals, and obtains an accumulated angular velocity signal M10. When the accumulated angular velocity signal M10 exceeds the threshold M0, similar to the above case, controller 14 stops the output of the drive signal S1 as shown in FIG. 10C, the predetermined time period t later after the vehicle is returned to the straight-ahead state. Thus the flashing operation of lighting device 10 is stopped. As described above, both values indicative of the left direction and the right direction are shown in positive values in the charts showing changes in the angular velocity signal with time. Thus the accumulated value is obtained by accumulating positive values.

In short, when the detected angular velocity is smaller than the threshold value M0 in a left or right turn, controller 14 calculates the accumulated value of these values. Thus, even when the rotating operation of steering wheel 6 is extremely small and substantially no angular velocity is applied to angular velocity sensor 15, turn signal lamp 9L is securely turned off after a lane change.

Fifth Operation Example

Figure 11:
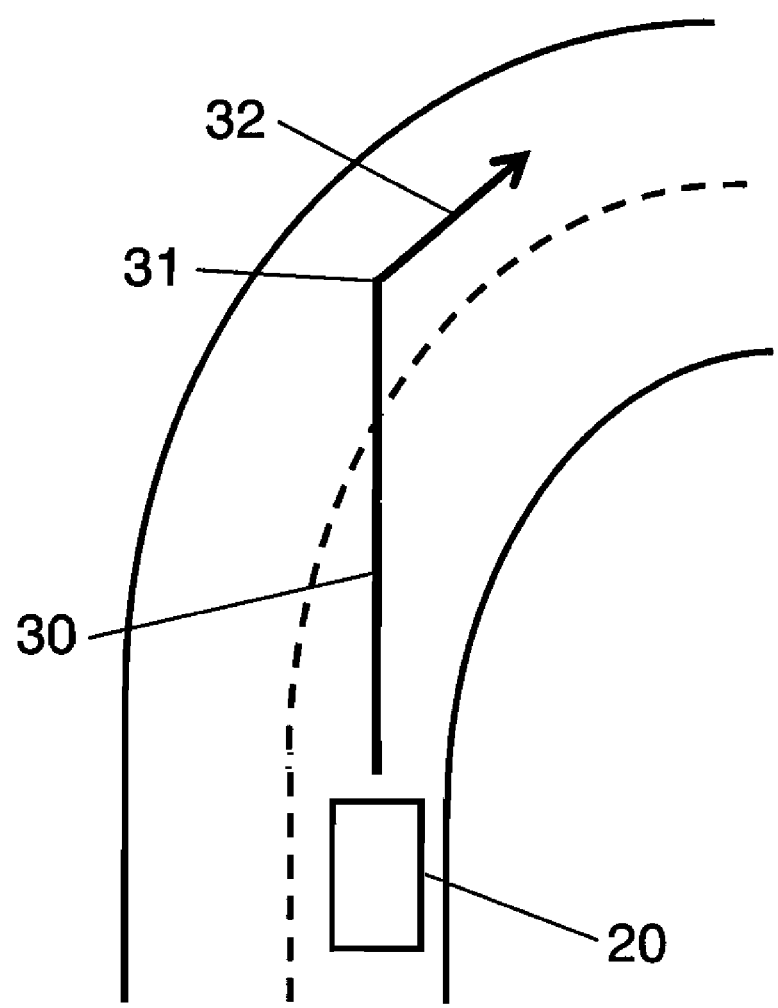
FIG. 11 is a plan view showing an operation of the vehicle in accordance with a fifth operation example of the exemplary embodiment of the present invention.
Figure 12A:
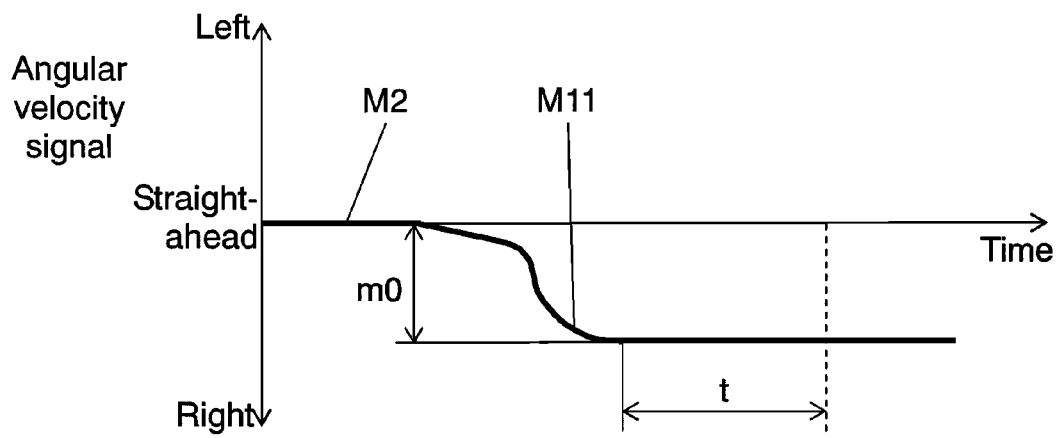
FIG. 12A, FIG. 12B, and FIG. 12C are waveform charts showing signals in the turning direction indicator of FIG. 1 in accordance with the fifth operation example of the exemplary embodiment of the present invention.
Figure 12B:
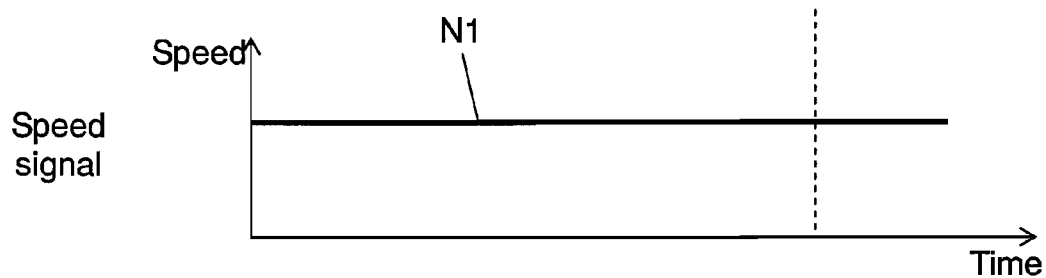
Figure 12C:
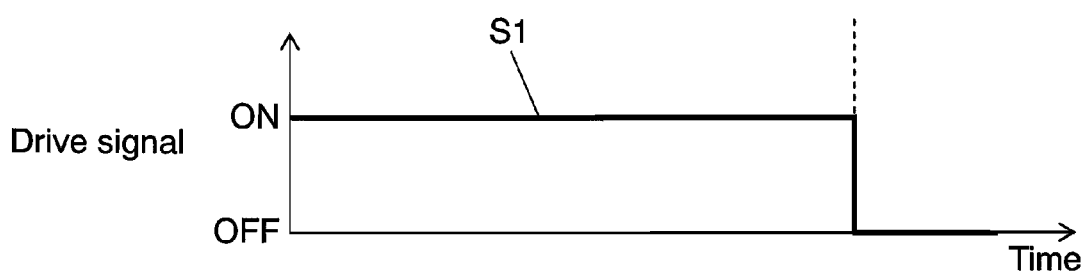

Next, a description is provided of the fifth operation example, with reference to FIGS. 11 through 12C. FIG. 11 is a plan view showing an operation of the vehicle in accordance with the fifth operation example of the exemplary embodiment. FIG. 12A, FIG. 12B, and FIG. 12C are waveform charts showing signals in accordance with the fifth operation example of the exemplary embodiment.

For example, suppose, while left turn signal lamp 9L is flashing, after straight-ahead running of the vehicle in a curved path, the driver rotates steering wheel 6 in the right direction and changes vehicle 20 from the right side lane to the left side lane as shown by lines 30 and 31 and line 32 with the arrow in FIG. 11. In this case, as shown in the waveform chart of FIG. 12A, an angular velocity signal M11 in the right direction instead of the left direction is supplied from angular velocity sensor 15 to controller 14.

At this time, to controller 14, the speed signal N1 as shown in FIG. 12B is supplied from speed meter 18.

Further, the output of this angular velocity signal M11 continues for a certain time period until the completion of the curve. At this time, controller 14 calculates a voltage difference between the angular velocity signal M2 in the straight-ahead running before entry into the curve, and the angular velocity signal M11 supplied while the vehicle is running in the curve with steering wheel 6 rotated in the right direction, as a temporary threshold value m0. When the temporary threshold value m0 continues at least for a predetermined time period t, e.g. 0.5 second, and controller 14 determines that the lane change is complete, controller 14 stops the output of the drive signal S1, as shown in FIG. 12C, even in a case where no angular velocity signal in the left direction is detected. Thus left turn signal lamp 9L is turned off.

In short, controller 14 calculates a difference between the angular velocity signal M2 and the angular velocity signal M11 as the temporary threshold value m0. The signal M2 is supplied during the straight-ahead running before entry into the curve, and the signal M11 is supplied during the running in the curve. Thus, even in a case where, while turn signal lamp 9L in the direction to which the lane is to be changed is flashing, the driver rotates steering wheel 6 in the reverse (right) direction and makes a lane change, turn signal lamp 9L can be turned off securely.

Sixth Operation Example

Figure 13:
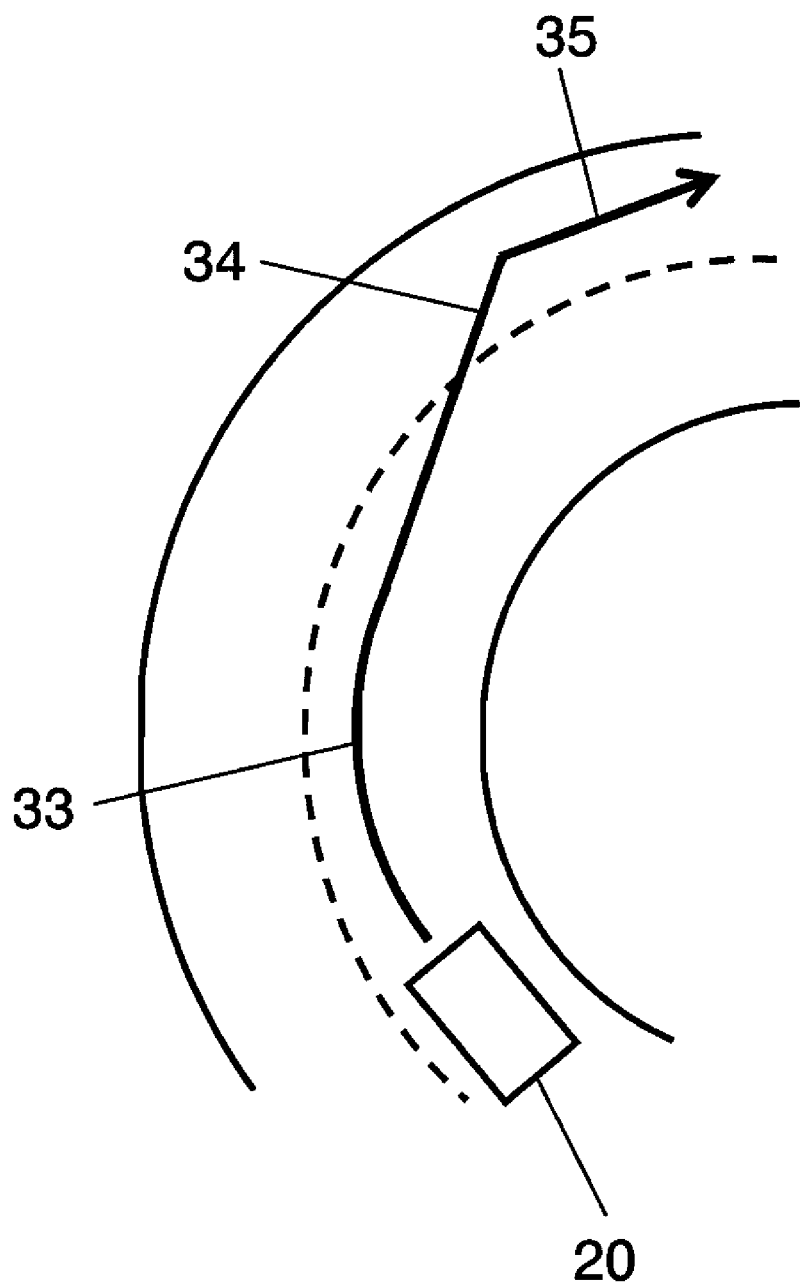
FIG. 13 is a plan view showing an operation of the vehicle in accordance with a sixth operation example of the exemplary embodiment of the present invention.
Figure 14A:
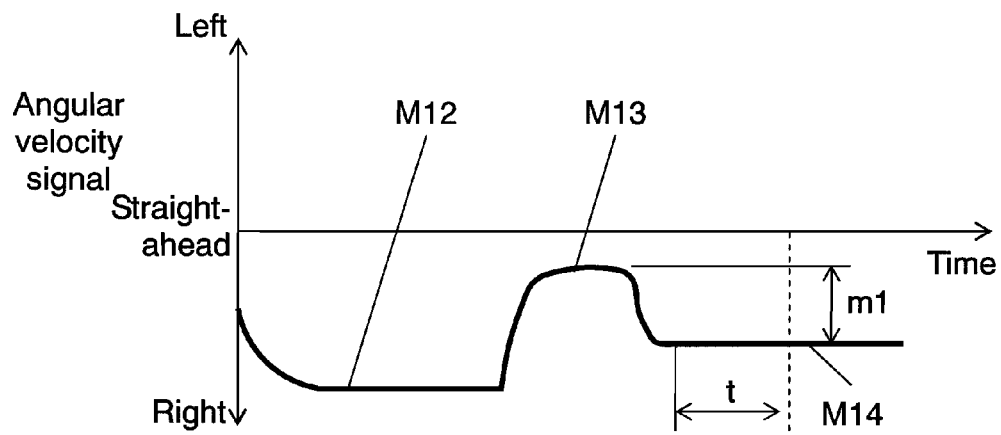
FIG. 14A, FIG. 14B, and FIG. 14C are waveform charts showing signals in the turning direction indicator of FIG. 1 in accordance with the sixth operation example of the exemplary embodiment of the present invention.
Figure 14B:
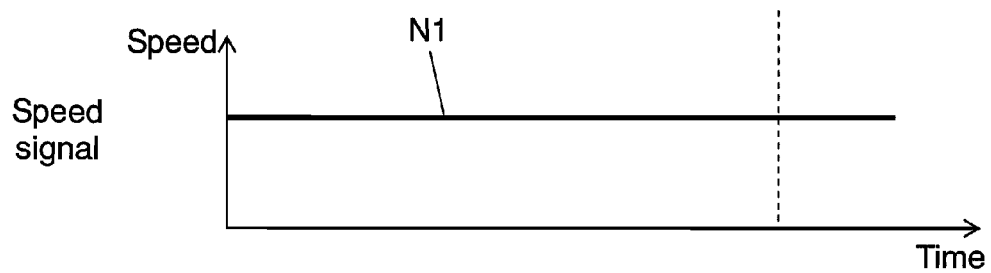
Figure 14C:
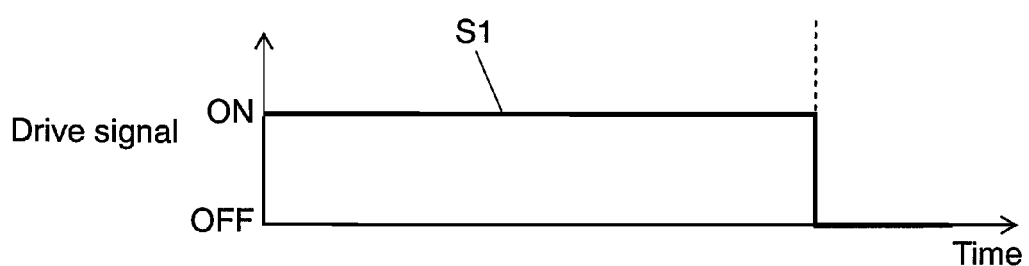
Figure 15:
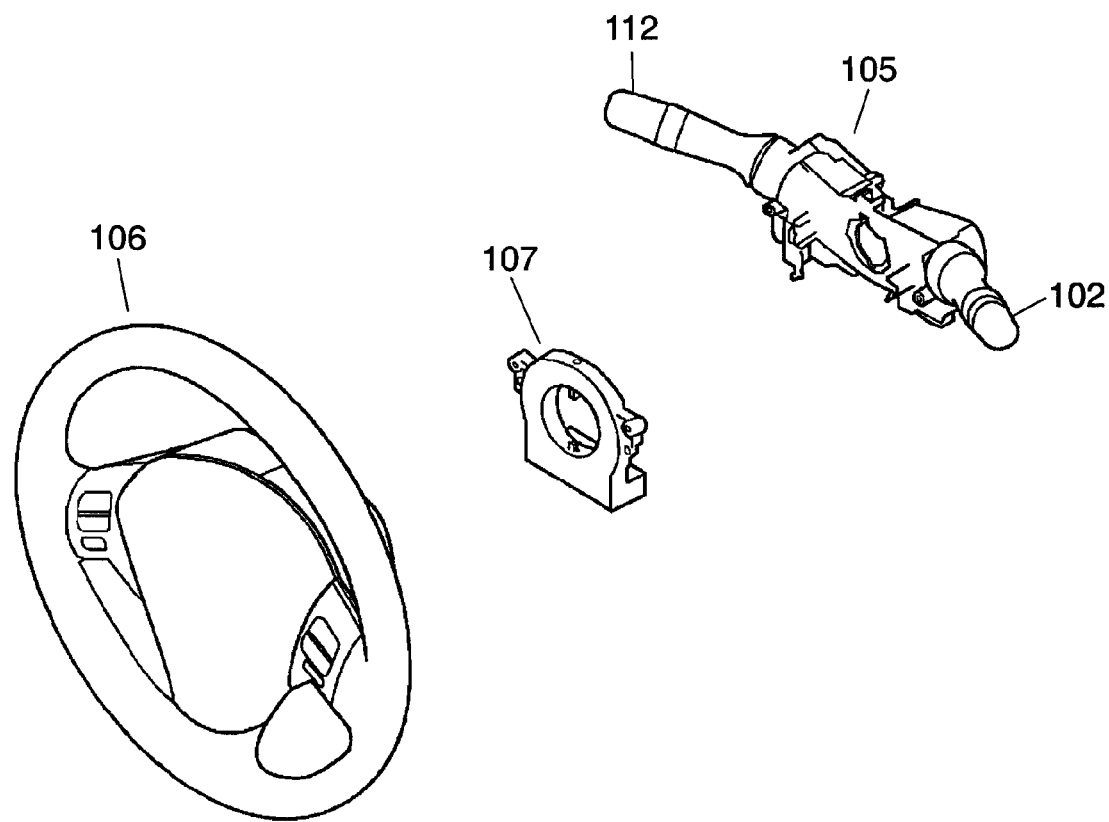
FIG. 15 shows a perspective view of a conventional steering wheel.
Figure 16:
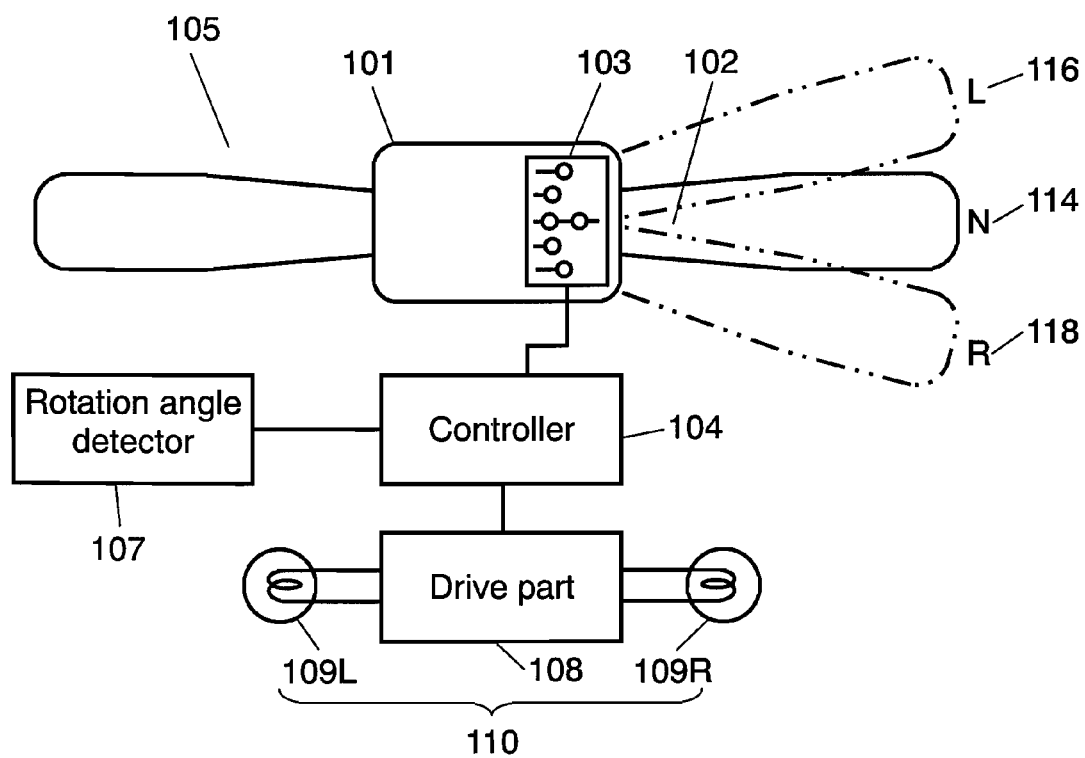
FIG. 16 shows a structure of a conventional turning direction indicator.

Next, a description is provided of the sixth operation example, with reference to FIGS. 13 through 14C. FIG. 13 is a plan view showing an operation of the vehicle in accordance with the sixth operation example of the exemplary embodiment. FIG. 14A, FIG. 14B, and FIG. 14C are waveform charts showing signals in accordance with the sixth operation example of the exemplary embodiment.

Suppose, as shown by lines 33 and 34 and line 35 with the arrow in FIG. 13, while vehicle 20 is running in a curved path, the driver flashes left turn signal lamp 9L and changes the vehicle from the right side lane to the left side lane. In this case, because the vehicle is running in a curve, steering wheel 6 is rotated in the right direction, and thus an angular velocity in the right direction has already been applied to angular velocity sensor 15. Thus, as shown in the waveform chart of FIG. 14A, from angular velocity sensor 15 to controller 14, an angular velocity signal M12 in the right direction is supplied.

At this time, to controller 14, the speed signal N1 as shown in FIG. 14B is supplied from speed meter 18.

Further, thereafter, when steering wheel 6 is slightly returned to the left direction, an angular velocity signal M13 at a low voltage is supplied from angular velocity sensor 15. Further, after the lane change, when steering wheel 6 is rotated in the right direction again in the left side lane, an angular velocity signal M14 at an increased voltage is supplied to controller 14.

Further, at this time, controller 14 calculates a voltage difference between the angular velocity signal M13 and the angular velocity signal M14 s as temporary threshold value m1. The signal M13 is supplied when steering wheel 6 is slightly returned to the left direction, and the signal M14 is supplied when the steering wheel is rotated in the right direction again. When the temporary threshold value m1 continues at least for a predetermined time period t, e.g. 0.5 second, and controller 14 determines that the lane change is complete, controller 14 stops the output of the drive signal S1 as shown in FIG. 14C, even in a case where no angular velocity signal in the left direction is detected. Thus left turn signal lamp 9L is turned off.

In short, controller 14 calculates a difference between the angular velocity signal M13 at a lower voltage after the flashing operation of turn signal lamp 9L, and the angular velocity signal M14 at a higher voltage thereafter, as the temporary threshold value m1. Thus, even in a case where, while turn signal lamp 9L in the direction to which the lane is to be changed is flashing, the driver rotates steering wheel 6 in the reverse (right) direction and makes a lane change during running in a curved path, the flashing operation of lighting device 10 is stopped the predetermined time period t later after the lane change.

As described above, in this exemplary embodiment, controller 14 controls the output of the drive signal, according to the angular velocity signal from angular velocity sensor 15. This control allows the drive signal S1 to be supplied or stopped, according to the angular velocity signal from angular velocity sensor 15 that is small and integratable with the turning direction indicator, without the use of another device, such as a steering wheel angle sensor. This can eliminate the need for complicated connection and simplify the structure of the indicator. Thus a turning direction indicator capable of ensuring indication of a direction can be provided.

Further, controller 14 controls the output of the drive signal S1, according to the vehicle speed signals N1 and N2, in addition to angular velocity signals M3, M4, M5, and M2. Thus, even when vehicle 20 once stops in the middle of a left turn or a right turn, indication of a turning direction can be ensured without any false detection.

Further, controller 14 sets the predetermined threshold value M0, or calculates the threshold value m0 or m1 for the angular velocity signals. Thus, even when vehicle 20 makes a left or right gentle turn with a low angular velocity, or a line change in a curved path, for example, indication of a turning direction can be ensured without any false detection.

The above descriptions have been provided for a structure in which controller 14 and angular velocity sensor 15 are integrally formed on a wiring board of turning direction indicator 17. The present invention can also be implemented in a structure in which controller 14 is formed on the electronic circuit side of a vehicle, or a structure in which angular velocity sensor 15 is installed in another portion of the vehicle.

The above descriptions of the first through sixth operation examples give examples in which a vehicle makes a left turn or lane change to the left side lane with left turn signal lamp 9L flashing and thereafter the left turn signal lamp 9L is turned off. In a case where the vehicle makes a right turn or lane change to the right side lane with right turn signal lamp 9R flashing and thereafter right turn signal lamp 9R is turned off, the operation is made in the reverse direction and in the same manner as the above operation. In other words, in the first to sixth operation examples, the left turn or the lane change to the left side lane is exchanged for a right turn or a lane change to the right side lane, and the directions (left and right) of the angular velocity signals are reversed. Thus the operation of this case can be described in the same manner.

The turning direction indicator of the present invention is capable of ensuring indication of a direction with a simplified structure, and is useful for indicating a turning direction mainly of a vehicle or the like.

What is claimed is:

1. A turning direction indicator for use in a vehicle, for indicating a turning direction of the vehicle, the vehicle including a steering wheel, a speed meter, and a light source for a turn signal, the turning direction indicator comprising:
- an operating part;
- a plurality of switch contacts to be brought into or out of electrical contact with each other, in response to operation of the operating part;
- an angular velocity sensor for detecting an angular velocity of a turn of the vehicle, and outputting an angular velocity signal; and
- a controller for controlling output of a drive signal, according to the electrical contact between the switch contacts and the angular velocity signal, the drive signal being for causing operation of the light source;
- wherein the controller controls the output of the drive signal, according to the angular velocity signal and a speed signal, the speed signal being indicative of a speed of the vehicle and supplied from the speed meter.

2. The turning direction indicator of claim 1, wherein the operating part includes a lever of which position is changeable from a neutral position in upward and downward directions.

3. A turning direction indicator for use in a vehicle, for indicating a turning direction of the vehicle, the vehicle including a steering wheel, a speed meter, and a light source for a turn signal, the turning direction indicator comprising:
- an operating part;
- a plurality of switch contacts to be brought into or out of electrical contact with each other, in response to operation of the operating part;
- an angular velocity sensor for detecting an angular velocity of a turn of the vehicle, and outputting an angular velocity signal; and
- a controller for controlling output of a drive signal, according to the electrical contact between the switch contacts and the angular velocity signal, the drive signal being for causing operation of the light source;
- wherein the controller sets or calculates a predetermined threshold value for the angular velocity signal; and
- wherein the controller controls the output of the drive signal, according to a relation between the set threshold value and the angular velocity signal, and a relation between the angular velocity signal and a speed signal, the speed signal being indicative of a speed of the vehicle and supplied from the speed meter.

4. The turning direction indicator of claim 3, wherein, in a case where, while the speed signal is detected, the angular velocity signal exceeds the threshold value, and thereafter the angular velocity signal takes a constant value indicative of detection of no angular velocity, the controller controls the output of the drive signal so that the operation of the light source is stopped.

5. The turning direction indicator of claim 4, wherein the controller sets the threshold value, according to the speed signal.

6. The turning direction indicator of claim 3, wherein, in a case where the angular velocity signal exceeds the threshold value and the speed signal is detected, thereafter the angular velocity signal takes a constant value indicative of detection of no angular velocity signal while the speed signal is not detected, thereafter the angular velocity signal exceeds the threshold value and the speed signal is detected, and the angular velocity signal takes the constant value indicative of detection of no angular velocity while the speed signal is detected, the controller controls the output of the drive signal so that the operation of the light source is stopped.

7. The turning direction indicator of claim 3, wherein, in a case where, while the speed signal is detected, the angular velocity signal exceeds the set threshold value, thereafter the angular velocity signal takes a value indicative of an angular velocity in a reverse direction, and thereafter the angular velocity signal takes a constant value indicative of detection of no angular velocity, the controller controls the output of the drive signal so that the operation of the light source is stopped, a predetermined time period later after the angular velocity signal has taken the constant value.

8. The turning direction indicator of claim 3, wherein, in a case where, while the speed signal is detected, the angular velocity signal lower than the set threshold value is detected, thereafter the angular velocity signal indicative of an angular velocity in a reverse direction is detected, and an accumulated value that the controller obtains by accumulation of the values of the angular velocity signal exceeds the threshold value, the controller controls the output of the drive signal so that the operation of the light source is stopped a predetermined time period later after the angular velocity signal has taken a constant value.

9. The turning direction indicator of claim 3, wherein, in a case where, while the speed signal is detected, the angular velocity signal indicative of an angular velocity in a reverse direction of the turning direction is detected and the angular velocity signal continues for a predetermined time period, the controller controls the output of the drive signal so that the operation of the light source is stopped.

10. The turning direction indicator of claim 3, wherein, in a case where, while the speed signal is detected, the angular velocity signal indicative of an angular velocity in a reverse direction of the turning direction is detected, the angular velocity signal decreases once and thereafter increases in the reverse direction of the turning direction, and the increased angular velocity signal continues for a predetermined time period, the controller controls the output of the drive signal so that the operation of the light source is stopped.

11. The turning direction indicator of claim 3, wherein the operating part includes a lever of which position is changeable from a neutral position in upward and downward directions.

* * * * *